_United States Patent Office_

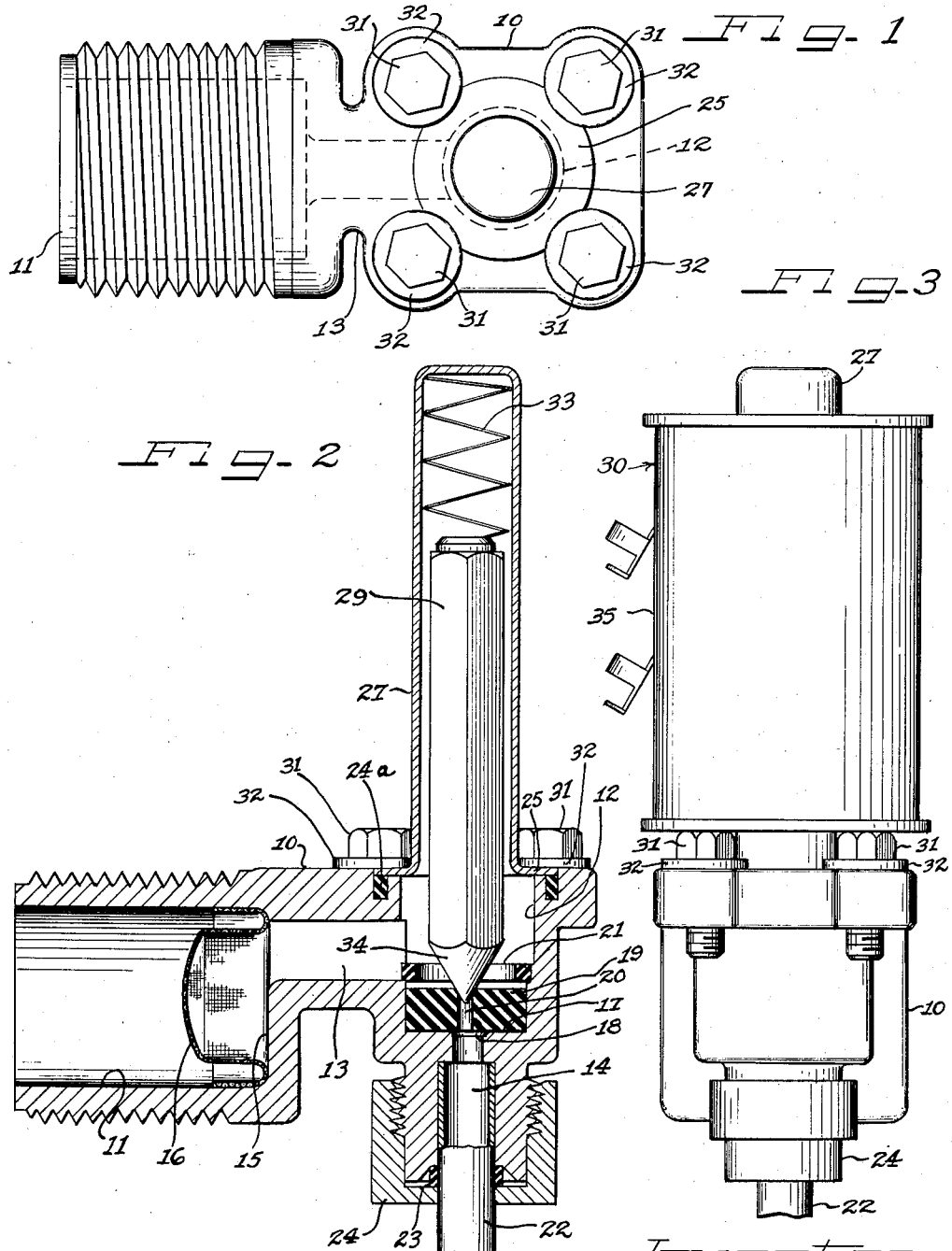

2,888,237
Patented May 26, 1959

2,888,237

CONSTANT RATE OF FLOW SHUT-OFF VALVE

Robert R. Dahl, Chicago, Ill., assignor to The Dole Valve Company, Chicago, Ill., a corporation of Illinois Application March 9, 1953, Serial No. 340,989

1 Claim. (Cl. 251—120)

This invention relates to improvements in shut-off valves and more particularly relates to a simplified form of constant rate of flow shut-off valve.

A principal object of my invention is to provide a novel and simplified form of shut-off valve delivering a substantially constant volume of fluid regardless of variations in pressure of the fluid at the inlet of the valve.

Another object of my invention is to provide a novel form of constant rate of flow shut-off valve arranged with a view toward utmost simplicity and efficiency in construction and operation.

A still further object of my invention is to provide a simplified construction of constant rate of flow valve giving improved performance characteristics by utilizing a resilient flow control annulus as the seat for the valve.

Still another object of my invention is to provide a novel and improved form of constant delivery volume shut-off valve wherein a substantially constant rate of flow of fluid is attained regardless of variations in pressure of the fluid at the inlet of the valve by the use of a deformable flow control annulus seated in the outlet from the valve body, and wherein the flow of fluid through the annulus is controlled by the armature of a solenoid having an end affording a valve engageable with a seat formed by the opening through the annulus of the flow control.

These and other objects of my invention will appear from time to time as the following specification proceeds and with reference to the accompanying drawings, wherein:

Figure 1 is a top plan view of a solenoid-operated constant rate of flow valve constructed in accordance with my invention, with the magnetic coil for the solenoid removed;

Figure 2 is a transverse sectional view taken through the valve shown in Figure 1; and Figure 3 is an end view of the valve shown in Figure 1, showing the electromagnetic coil of the solenoid mounted on the guide for the armature of the solenoid.

In the embodiment of my invention illustrated in the drawings, I have shown a valve casing 10 having an inlet 11 leading into a central chamber 12 formed in said casing. The central chamber 12 is shown as extending at right angles to the inlet 11 and is communicating with the inlet 11 through a passageway 13 offset from the center of the passageway 11. The chamber 12 is shown as opening from the valve body at one of its ends and as having a reduced diameter outlet 14 leading therefrom in axial alignment therewith.

The junction between the inlet 11 and the offset passageway 13 is shown as forming a shoulder 15 disposed eccentrically of the passageway 13 having a screen or strainer 16 seated therein, to strain sediment from fluid entering the chamber 12.

The valve body 10 may be made from a "nylon" plastic or from brass or bronze or any other suitable material, a preferred material being a "nylon" plastic, due to the ease of molding and machining the same and its decreased cost over brass or bronze, making it an extremely economical material for valve bodies of the class described.

The valve chamber 12 is shown as leading directly to the reduced diameter outlet 14 and as having a shoulder 17 at the junction between said valve chamber and outlet. A frusto-conical surface 18 is also shown as connecting the shoulder 17 of the valve chamber 12 with the outlet 14 and forming a frusto-conical recess within which a resilient annulus 19 may flex upon increases in pressure thereon.

The resilient annulus 19 may be a well known form of resilient annular flow control member similar to that shown and described in Patent No. 2,389,134 which issued to C. A. Brown on November 20, 1945. The flow control shown is generally in the shape of a washer or flat disk having a central opening or orifice 20 leading therethrough, the diameter of which is considerably smaller than the diameter of the inner marginal edge of the shoulder 17. While the flow control illustrated is like that of Patent No. 2,389,134 it should be understood that a flow control like that shown in Patent No. 2,454,929 which issued on November 30, 1948, may be used.

The outside diameter of the annulus or flow control 19 is substantially the same as the inside diameter of the chamber 12, so as to fit snugly within said chamber and bear against the shoulder 17 and flex within the lip or edge of said shoulder into the frusto-conical surface 18, upon increases in pressure on the upstream side of said annulus, effecting a reduction in the cross-sectional area of the central opening or orifice 20 leading therethrough. A retainer 21, which may be a snap ring, is shown as being seated within the chamber 12 in vertically spaced relation with respect to the annulus 19 to retain said annulus within the chamber 12 to be engaged with the shoulder 17 and flex within the frusto-conical surface 18 upon the application of pressure thereto.

The outlet 14 is shown as having a tube or pipe 22 leading therefrom and encircled by a gasket 23 at the outer end thereof, and retained within said outlet by means of a coupling or nipple 24 threaded on the projecting portion of the casing 10, forming the outlet 14.

The end of the valve casing 10 opposite from the outlet 14 is shown as having a packing member or gasket 24a recessed therein and spaced radially from the chamber 12 and encircling the same.

The valve body 10 is shown as being recessed inwardly of the outer margins of the packing ring 24a to receive a flange 25 of a cap and guide tube 27. The cap and guide tube 27 is shown as closing the opposite end of the chamber 12 from the outlet 14, and also as forming a guide for an armature 29 of a solenoid 30. The flange 25 of the cap 27 may be held in engagement with the packing ring 24a to compress the same, and form a fluid tight joint with the end of the valve body by means of a plurality of cap screws 31, 31 threaded in said valve body and having washers 32, 32 thereon engaging the outer surface of the flange 25.

The armature 29 is shown as being biased into engagement with the orifice 20 leading through the resilient annulus 19 by means of a compression spring 33 interposed between the outer end of said armature and the inside of the end of the cap 27. The end of the armature 29 facing the orifice 20 is shown as being of a generally conical form as indicated by reference character 34, to engage within said orifice and block the flow of fluid therethrough.

The armature 29 is disengaged from the orifice 20 upon the energization of an electromagnetic coil 35. As herein shown the coil 35 is mounted on the stem 27 and encircles the same. Thus upon energization of the coil 35, the conical end 34 of the armature 29 is withdrawn from said annulus, to accommodate the free flow of fluid therethrough. As the inlet pressure increases, the resilient annulus 19 will flex within the frusto-conical surface 18 by the pressure of the fluid on the upstream side thereof, resulting in a reduction in cross-sectional area in the passageway or orifice 20 on its upstream side, and in increase in cross-sectional area of said passageway on the downstream side thereof, and providing a substantially constant rate of flow through the outlet passage 14, regardless of variations in pressure of the fluid in the inlet of the valve body 10.

It should here be understood that various predetermined constant rates of flow may be attained by varying the size of the orifice 20 through the annulus 19 and that such variations in diameter of the flow orifice through the annulus will have no effect on the operation of the valve 34, the same valve being suitable for all variations in flow which may be attained.

It may be seen from the foregoing that a simplified form of constant rate of flow valve has been attained by using the orifice through a flow control annulus as the seat for the valve, and by engaging said valve seat with the conical end of the armature of a solenoid.

It may further been seen that the valve of my invention may be readily adapted for various predetermined rates of flow by merely changing the diameter of the orifice through the resilient annulus without affecting any of the operating parts of the valve.

It will be understood that various modifications and variations of the present invention may be effected without departing from the scope of the novel concepts thereof.

I claim as my invention:

A combination shutoff valve and constant rate of flow maintaining device comprising a valve body having a flow passageway therethrough, an annular supporting shoulder in said passageway facing upstream, a resilient annular flow control washer element seated on said shoulder and having a central flow orifice therethrough of lesser diameter than the annular shoulder whereby the area of the washer adjacent the orifice is unsupported for flexing under pressure upstream thereof to reduce the effective size of the orifice to provide a substantially constant rate of flow control with variations in pressure, the portion of said passageway upstream of said orifice having a flow area at least as great as the maximum area of said orifice, a movable valve member positioned in said passageway upstream of said resilient washer, means normally biasing said valve member against the upstream side of said resilient washer to close said orifice independently of the pressure upstream of said washer, and control means energizable to move said valve member against said biasing means to move said valve member away from said resilient washer to provide flow through said orifice unobstructed by said valve member.

References Cited in the file of this patent

UNITED STATES PATENTS

| 483,172 | Schrader | Sept. 27, 1892 |
| 2,328,805 | Holthouse | Sept. 7, 1943 |
| 2,454,929 | Kempton | Nov. 30, 1948 |
| 2,558,962 | Kempton | July 3, 1951 |
| 2,572,244 | Chace | Oct. 23, 1951 |
| 2,634,758 | Ojalvo | Apr. 14, 1953 |
| 2,638,927 | Walker | May 19, 1953 |
| 2,664,674 | Niesemann | Jan. 5, 1954 |
| 2,708,092 | Smith | May 10, 1955 |
| 2,732,859 | Chace | Jan. 31, 1956 |
| 2,772,833 | Chace | Dec. 4, 1956 |
| 2,815,923 | Clark | Dec. 10, 1957 |

FOREIGN PATENTS

| 364,020 | France | May 19, 1906 |